United States Patent [19]

Reuter et al.

[11] Patent Number: 4,687,577
[45] Date of Patent: Aug. 18, 1987

[54] CONTAINER FOR THE PURIFICATION OF LIQUIDS

[75] Inventors: Karl-Heinz Reuter, Cologne; Heinz Meckl, Bergisch Gladbach, both of Fed. Rep. of Germany

[73] Assignee: Agfa Gevaert Aktiengesellschaft, Leverkusen, Fed. Rep. of Germany

[21] Appl. No.: 902,784

[22] Filed: Sep. 2, 1986

[30] Foreign Application Priority Data

Sep. 14, 1985 [DE] Fed. Rep. of Germany ... 8526326[U]

[51] Int. Cl.⁴ .............................................. B01J 47/02
[52] U.S. Cl. ..................................... 210/288; 210/289
[58] Field of Search ............... 210/266, 288, 289, 291, 210/350

[56] References Cited

U.S. PATENT DOCUMENTS 2,014,445  9/1935  Miller ................................... 210/288

Primary Examiner—Ivars Cintins
Attorney, Agent, or Firm—Connolly & Hutz

[57] ABSTRACT

Container for active purifying agent for the purification of liquids, in particular photographic processing baths, comprising a container bottom above which is a space (2) for containing active purifying substance, a closure mechanism (5), an inlet tube (6) and a discharge tube (7) wherein a porous, compressible mass (4) is arranged between the space (2) for active purifying substance and the closure device (5).

2 Claims, 2 Drawing Figures

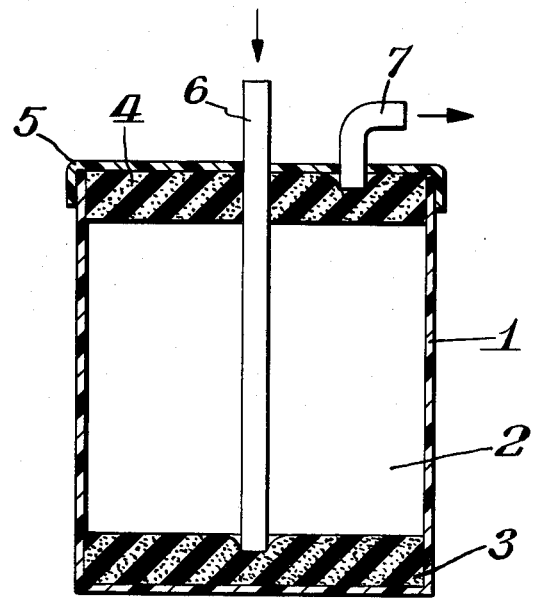
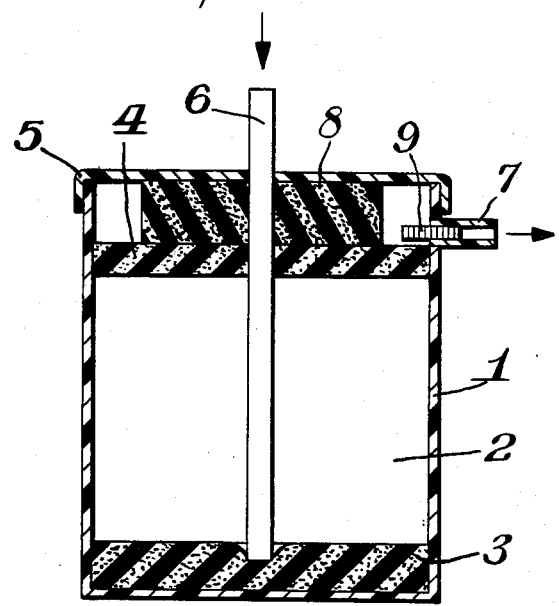

CONTAINER FOR THE PURIFICATION OF LIQUIDS

This innovation relates to a container for the purification of liquids, in particular photographic developers.

It is known to free liquids from unwanted constituents by means of active cleaning agents such as adsorption resins, ion exchangers and the like. Thus it is known to use ion exchangers for the purification of photographic developers in containers in the form of canisters containing inlet and outlet tubes for developer firmly attached to the inside of the canister. A disadvantage of such containers is their comparatively high cost, especially when canisters containing spent purifying agent are to be replaced by similar canisters containing fresh active purifying agent.

It is also known to use containers which have a porous mass at the bottom and are filled right to the top with the ion exchanger resin.

In the technology of exchangers, it is preferred to maintain a ratio of resin column height to width within the range of 5:1 to 10:1 but at least 2:1 in order to achieve optimum utilization of the resin.

This ratio of height to width results in very slim columns which entail problems of mechanical stability requiring the use of supports, especially if the containers are small, with capacities in the region of 0.5 to 5 l.

Moreover, such small containers have relatively small feed openings so that filling the containers becomes difficult.

It is an object of the present innovation to provide improved containers, optionally with a low height to width ratio, for containing active purifying agents for the purification of liquids.

The present innovation relates to a container for active purifying agents for the purification of liquids, in particular photographic processing baths, comprising a container bottom, a space above the bottom for containing an active purifying substance, and a closure device, characterised in that a porous, compressible mass is arranged between the space for containing active purifying agent and the closure device.

Such a container is surprisingly found to be eminently suitable for the purification of liquids by means of active purifying agents. The container contains an active purifying agent for this purpose. In addition, the container has a removable closure device which may be either a so-called working closure mechanism or a simple cap designed to be pushed or screwed into position to enable the container with active purifying agent inside it to be safely transported and stored before and after use.

The following are preferably rigidly connected to the aforesaid working closure device:

An inlet tube extending almost to the bottom of the inside of the container and a discharge tube having its internal open end situated close to the removable closure device.

In a preferred embodiment, the inlet tube and discharge tube can be screwed or plugged into the closure device. In another preferred embodiment, the inlet tube can be screwed or plugged to the closure device while the discharge tube can be screwed or plugged to the wall of the container.

In a preferred embodiment, the container is in addition provided with a porous, compressible mass situated inside the container, near the bottom, and substantially covering the whole of the container bottom. In one particularly preferred embodiment, the inner open end of the inlet tube extends right into the additional porous, compressible mass at the bottom of the container.

Instead of or in addition to having an axial opening, the end of the inlet tube extending into the container may have a plurality of radial openings in the form of bores or slots uniformly distributed over its wall. The inner open end of the discharge tube is situated in the upper part of the container, i.e. in or close to the closure device.

The closure device, whether it be a transport and storage closure device or a working closure device, may close the container tightly, in particular watertightly, when placed in position, and sealing devices such as sealing rings may be used for this purpose between the container and the closure device. A firm connection between the container and the closure device may be established, for example, by a screw fitting or by a bayonet-type fitting.

The container is preferably uniform in cross-section over most of its height. This cross-section (area of base) may be circular, oval or polygonal, preferably with its greatest diameter not more than 50% greater than its smallest diameter. Containers which have the form of a rectangle, in particular a square or a regular hexagon in cross-section, for example, are suitable for space-saving stacking for storage and transport but cylindrical containers may also be used. The ratio of height of container to diameter of container bottom is preferably at least 0.5:1, in particular at least 2:1 and preferably at least 5:1. The volume of the container is generally greater than 500 ml. Containers having a volume of 1, 2 or 5 l, for example, are suitable for use in practice.

The container and the working closure device with inlet tube and discharge tube are preferably made of a plastics material. In a preferred embodiment, at least the container is made of a transparent plastics material so that the container content can be more easily checked.

The porous, compressible mass may be rigidly connected to the container and preferably has a thickness of 5 to 60 mm. This compressible mass is preferably a foam, e.g. of polyurethane.

The inlet tube is preferably arranged so that it ends at or close to the centre of the bottom. A fine meshed net or screen may be provided before the inner, open end of the discharge tube and/or in the discharge tube itself in order to prevent parts of active purifying agent from being carried along by the purified liquid.

The active purifying agents are preferably adsorption resins or ion exchangers, in particular anion exchangers. These remove unwanted constituents from spent developer when the latter is introduced. An anion exchanger would be capable, for example, of removing excess halide from the spent developer.

It is surprisingly found that when the apparatus is used in accordance with the instructions, the liquid entering the container from the end of the inlet tube becomes very uniformly distributed over the whole cross-section in the active purifying agent as soon as it leaves the porous, compressible mass. Optimum utilization of the active purifying agent is thereby ensured.

If the apparatus is correctly used according to instructions, the liquid to be purified is led into the container through the inlet tube, e.g. by gravity or by application of a hydrostatic pressure. The liquid then rises inside the container to enter into intimate contact with the active purifying agent and is thereby purified, and after passing through the porous mass it leaves the container through the discharge tube and may then be used again, if necessary after replacement of spent constituents.

When the active purifying agent is exhausted after prolonged use, it can be replaced by a very simple procedure. The working closure device or inlet and discharge tube are detached from the container containing the exhausted purifying agent and placed on a new container containing fresh active purifying agent after removal of the transport and storage cap originally supplied with the new container or removal of a seal covering the openings for insertion of the inlet and discharge tube. The container containing the exhausted purifying agent is then sealed off with the transport and storage cap originally supplied with it and may then either be discarded or reprocessed, optionally after an intermediate storage period.

In one special embodiment, the discharge tube is provided with a ventilating device for easier handling. In a preferred embodiment, the discharge tube is rigidly or flexibly connected to a Y-shaped or T-shaped connecting piece which has a ventilating opening at its upper end while the other free end is used for the discharge of purified liquid.

The invention will now be explained with reference to the accompanying figures, in which FIG. 1 shows the container according to the innovation with working closure device and FIG. 2 shows the container according to the innovation with another closure device.

According to FIG. 1, the container (1) has a closure device (5) which may be either pushed or screwed into position. This closure device may be a transport closure device with openings for the insertion of tubes but from which the seals covering the openings, e.g. adhesive strips, have been removed. On the bottom of the container lies an additional compressible porous mass (3) into which the inlet tube (6) is pushed. Above this porous mass is a space (2) for containing the active purifying substance and above this again is the porous, compressible mass according to the innovation, in the form of a disc (4). The liquid entering through the inlet tube (6) leaves the container through the discharge tube (7). The disc (4) has one opening and the closure device (5) two openings for the passage of the inlet tube (6) and discharge tube (7).

According to FIG. 2, the container (1) has a working closure device (5) which can be pushed or screwed into position and may also be in the form of a transport closure device with central insertion aperture from which the seal, e.g. an adhesive strip, has been removed. The inlet tube (6) extends into an additional compressible, porous mass (3) which lies on the bottom of the container. Situated above this mass (3) is the space (2) for containing active purifying substance and above this space is situated the porous, compressible mass (4) in the form of a disc which is connected to the closure device (5) by way of another mass (8) of smaller diameter. The parts indicated by the references (4) and (8) may be made as a single piece. The closure device (5) and the porous mass (4) are perforated to receive the inlet tube (6). The discharge tube (7) is arranged in the upper part of the container, above the porous mass (4) and may contain a filter (9).

The following Examples illustrate the advance obtainable with the innovation.

EXAMPLE 1 (COMPARISON)

A container (1) for treating a photographic developer solution is equipped as follows according to FIG. 1:

The container (1) which has an internal diameter of 95 mm and height of 130 mm is provided with a compressible, porous mass (3) arranged on the bottom of the container. Above this mass (3), 510 g of a conventional anion exchanger are introduced into the space for active purifying substance, which is thereby filled to a height of 80 mm. A closure device (5) is then screwed on to the container. This closure device has a central opening through which an inlet tube (6) is pushed into the compressible, porous mass (3). A discharge tube (7) containing a filter is arranged in another opening in the closure lid.

A spent conventional developer for colour photographic paper is pumped through this arrangement at the rate of 50 ml per minute. The developer contains 1.4 g of KBr per litre. The KBr concentration of 0.8 g per litre which is desired after the developer has passed through is reached when 38 litres have passed through the apparatus. The resin has taken up 22.8 g of KBr.

EXAMPLE 2 (INVENTION)

The container (1) is equipped as described in Example 1 but a porous, compressible mass in the form of a perforated disc having a thickness of 50 mm is inserted above the space (2) for active purifying substance and its thickness is reduced to half when the closure device is placed into position. The KBr concentration desired after the purifying treatment is 0.8 g per litre, as in Example 1. By this arrangement, this level is reached only after 47 l of liquid to be purified have passed through. The resin has by that time taken up 28.2 g of KBr.

This means that the capacity of the resin, expressed in litres of increased throughput or in grams of potassium bromide taken up, has been increased by 24%.

I claim:

1. Container for the purification of photographic processing baths comprising a container bottom above which is a space containing an anion exchanger and comprising a closure device, characterised in that a porous compressible foam is arranged between the space containing said anion exchanger and the closure device; and that rigidly connected to the closure device are an inlet tube extending through the interior of the container to almost the bottom of the container and a discharge tube the inner open end of which is situated close to the closure device.

2. Container according to claim 1, characterised in that the inner open end of the inlet tube extends into an additional porous compressible foam on the bottom of the container.

* * * * *